UNITED STATES PATENT OFFICE.

THOMAS, EARL OF DUNDONALD, OF LONDON, ENGLAND.

IMPROVEMENT IN COMPOSITIONS FOR COATING TELEGRAPHIC WIRES AND FOR OTHER PURPOSES.

Specification forming part of Letters Patent No. 11,096, dated June 13, 1854.

*To all whom it may concern:*

Be it known that I, THOMAS, Earl of Dundonald, of London, England, an Admiral in Her Brittanic Majesty's Navy, have invented a new and useful Improvement in Compositions for Coating and Insulating Telegraph-Wires and for other Similar Purposes; and I do hereby declare that the following is a full, clear, and complete description of my said improvement—that is to say:

My invention consists of a composition of which bitumen, mineral pitch, or asphaltum forms a part.

The composition to be hereinafter described is valuable for many purposes. The uses for which I chiefly design it are, however, for covering telegraph-wires, it being strongly adhesive, indestructible by vermin, acids, corrosion, or decay, either in the atmosphere, water, or underground, and it is, besides, an excellent non-conductor of electricity, effecting perfect insulation. I also intend to apply it to the forming of embankments for piers and foundations under water, and to fix sands to prevent them being washed away by currents, and thus alter harbors, &c.

In the forming of all vegetable adhesive or pitchy compounds it has been found that they lacked something to give them permanence, as those are all subject to rapid decomposition by exposure to the elements; but by the introduction of mineral bitumen into such compounds in certain proportions they are made to endure. The mineral, being an antiseptic, secures the vegetable matters from decomposition. The matters I use in combination with the native bitumen before named are shellac, rosin, tar, the unctuous or viscid oils of petroleum or other unctuous equivalent oils, and india-rubber. These matters, when compounded in the proportions and in the manner hereinafter described, form a perfect non-conducting material, strongly adhesive, very tenacious, and of any required elasticity, whereby it is rendered applicable to the purposes named.

The following is the method of forming the composition and applying the same: First, take gum-shellac in such quantity as may be required for a given weight of the composition at any time to be used. To this add rosin in the ratio of four or five parts to one of the former, the two being first finely pounded and sifted. To this add as a solvent the viscid oil of petroleum or of distilled tar, (commonly known as "dead-oil,") naphtha, or other partly-volatile substance of a similar nature, as may be most conveniently obtained, the proportion of one or other of these solvents to be one-tenth, or thereabout, of the joint weight of the two first-named articles. These are then to be subjected to a steam-heat in a proper vessel until the whole are dissolved and mixed. This forms an excellent non-conducting compound, but will not endure for any great length of time.

To give elasticity and flexibility to the composition before named, I add india-rubber, and, to give it permanence, bitumen, asphaltum, or mineral pitch. The bitumen is to be pounded and sifted and melted with the india-rubber in a separate vessel, and then added in proper quantity to the other composition, the whole to be subjected to a moderate heat and stirred until perfect homogeneity is obtained. The relative proportions of the bitumen and india-rubber will vary according as the mass is required to be more or less hard or soft or elastic, according to the situation in which the wire is to be used, as under water or on land, or for different climates. If the combination of materials is found to be too soft for its intended use, (as in a warmer climate, &c.,) add dry pounded bitumen; if too indurated, mix more of the unctuous or viscid oil; or in case of deficient tenacity or flexibility add india-rubber.

This composition possesses non-conducting qualities, combined with permanence, flexibility, and tenacity and adaptation to its intended use, possessed by no other heretofore known or used, and is of great practical utility, supplying a great and indispensable desideratum in the business of telegraphing, as by its use the wire may be permanently laid underground, dispensing with the use of poles, and thus avoiding the embarrassments now experienced from electricity and dampness in the air and the liability to accident from gales of wind, snow, and ice. Its great cheapness, too, is less than one-half that of any other known preparation for this use, it being mainly composed of a comparatively costless material, which, together with its absolute indestructibility possessed by no other composition, especially recommends it.

The proportions for the several materials may be ordinarily as follows: seventy-five parts of bitumen, ten parts of the shellac and rosin in solution with the unctuous or viscid oils before mentioned, proportioned as before named, and fifteen parts of india-rubber, which said proportions will insure the essential qualities of elasticity, tenacity, cohesion, and permanence.

The application of this composition may be made to the wire for telegraph purposes in several ways. I have found a good one to be to fill a box closed on all sides with the material and draw the wire through the midst of the same, the wire being heated by a spirit-lamp as it entered, and passing through holes in said box, the heated wire dissolving and taking up the composition immediately in contact. However, other ways may be resorted to, as may be thought best. In fixing sands or rolling stones on shores or beaches so that they cannot be washed away by floods or tides, the composition must be poured on the said sands and stones while hot; or sand, gravel, &c., may be mixed with the composition and this poured on, or the stones made hot and dipped into the composition, whereby an agglomeration is formed of the particles, rendering them fixed and permanent. It is also applicable to the formation of water-pipes, tanks, luting of joints, &c.

I do not claim the use of native bitumen or asphaltum for any of the purposes to which it has heretofore been applied. I do not claim any cement made therefrom by mixture as heretofore used; nor do I claim the covering of textile fabrics with any combination of bitumen or asphaltum.

What I do claim as my invention, and desire to secure by Letters Patent of the United States, is—

The combination of gum-shellac, rosin, tar, the unctuous oils or the viscid oil of coal-tar, bitumen, asphaltum, or mineral pitch and india-rubber, for the coating and insulating of telegraphic wires and for other purposes, as herein set forth and described, or any other specifically the same.

I, THOMAS, Earl of Dundonald, have hereunto set my hand this 4th day of April, 1853.

DUNDONALD.

Witnesses to the signature of the Earl of Dundonald:
THOS. ASPINWALL,
   *Consul U. S., London.*
JOSEPH MARQUETTE,
   *Clerk in the Consulate.*